United States Patent [19]

Hirose et al.

[11] Patent Number: 4,584,234

[45] Date of Patent: Apr. 22, 1986

[54] WRAPPING MATERIALS FOR PHOTOGRAPHIC MATERIALS

[75] Inventors: Masuhiko Hirose; Mutsuo Akao, both of Minami-ashigara, Japan

[73] Assignee: Fuji Photo Film Co., Ltd., Kanagawa, Japan

[21] Appl. No.: 631,063

[22] Filed: Jul. 16, 1984

[30] Foreign Application Priority Data

Jul. 20, 1983 [JP] Japan .................. 58-130781

[51] Int. Cl.$^4$ .......................... B32B 5/16; B32B 9/00
[52] U.S. Cl. .................. 428/323; 428/340; 428/408; 428/513; 428/516; 428/906; 430/538
[58] Field of Search ............ 428/408, 513, 340, 516, 428/323; 430/538

[56] References Cited

U.S. PATENT DOCUMENTS

| | | | |
|---|---|---|---|
| 4,312,937 | 1/1982 | Kasper et al. | 430/538 |
| 4,331,508 | 5/1982 | Miyama et al. | 430/538 |
| 4,352,861 | 10/1982 | von Meer et al. | 428/513 X |
| 4,357,191 | 11/1982 | Bullard et al. | 428/516 X |
| 4,447,524 | 5/1984 | Uno et al. | 430/538 |
| 4,452,846 | 6/1984 | Akao | 428/513 X |

*Primary Examiner*—Patricia C. Ives
*Attorney, Agent, or Firm*—Burns, Doane, Swecker and Mathis

[57] ABSTRACT

Wrapping materials for photographic materials comprising laminated layers of a paper support and at least one thermoplastic resin layer superposed on at least one surface of said paper support; said thermoplastic resin layer comprises a blended resin of (a) a high-density polyethylene having a density of 0.950 g/cm$^3$ or more and a melt index of 10-40 and (b) a low-density polyethylene having a density of 0.930 g/cm$^3$ or less and a melt index of 1-40, the weight ratio of (b)/(a) being 70/30-5/95, preferably 70/30-20/80, more preferably 60/40-40/60.

At least one layer of said wrapping materials optionally comprises light-shielding substance in an amount of 1.0-30 g/m$^2$.

11 Claims, 5 Drawing Figures

WRAPPING MATERIALS FOR PHOTOGRAPHIC MATERIALS

FIELD OF THE INVENTION

The present invention relates to wrapping materials for photographic materials, especially to light-shielding papers for photographic roll films used as backing paper.

BACKGROUND

Various attempts have heretofore been made on a light-shielding paper for photographic roll films. For example, British Pat. No. 1,156,302 discloses a laminated sheet manufactured by printing one surface of paper and laminating a carbon black-containing polyethylene layer on the other surface by extrusion-lamination. U.S. Pat. Nos. 2,646,365; 2,646,366; 2,751,309; 2,959,492 and 3,053,779 disclose laminated sheets as shown in FIG. 1 attached hereto, where a protective layer (2) is coated on the printed surface (printed layer -7) of a paper support (3), and on the other surface is formed a carbon black-containing vinylidene chloride or styrene-butadiene copolymer layer (1a) by solvent-coating method.

A light-shielding paper manufactured by extrusion-lamination of ethylene-(meth)acrylate copolymer (containing carbon black) is described in Japanese Kokoku-Publication No. 51(1976)-49205 (which is referred to U.S. Pat. No. 3,832,218). In addition, carbon black-containing polyethylene-laminated papers are known.

However, these prior arts, especially the light-shielding papers as disclosed in said British Patent and Japanese Publication, include some drawbacks, as mentioned below.

First, these are apt to be severely charged, and therefore, when in a camera or before development the backing paper is peeled off from a film. The film suffers an electrostatic charge due to friction therebetween often resulting in the occurrence of static marks on the film.

Second, the extrusion-laminated layer of ethylene/(meth)acrylate copolymer or low density polyethylene cannot be cut or perforated well, and the polymer has whisker-like burrs which occur at the cut or perforated edge, and because of this, not only the appearance is poor but also the whisker-like polymer burrs are often cut and adhere on the surface of films.

Furthermore, the surface of the laminated layer has poor slide property, resulting in troublesome problems in the processing steps for the manufacture of light-shielding papers. In practical use, moreover, the friction between the backing paper and a photographic film within a camera, and the friction between the former and the camera or cartridge is large resulting in a high film take-up resistance.

Although the light-shielding papers of the above mentioned U.S. Patents have far better properties, a large amount of solvents are to be used in the manufacture thereof and a drying step is necessary, and thus, these are disadvantageous with respect to the cost thereof.

SUMMARY OF THE DISCLOSURE

The object of the present invention is to provide novel wrapping materials for photographic materials, particularly light-shielding papers therefor, especially which are free from various defective problems in conventional means and which have excellent properties with respect to the above mentioned points. Other objects of the present invention will become apparent in the entire disclosure.

For this, the present invention provides wrapping materials for photographic materials as well as light-shielding papers therefor, comprising a paper support and at least a blended resin layer comprising a high-density polyethylene (HDPE) and a low-density polyethylene (LDPE), said resin layer being laminated on said support. By using a specific blended-thermoplastic resin comprising HDPE and LDPE within the range of a determined ratio, the above mentioned drawbacks in the prior art may be eliminated.

Accordingly, the present invention provides wrapping materials for photographic materials, comprising laminated layers comprised of a paper support and at least one thermoplastic resin layer superposed on at least one surface of said paper support; said thermoplastic resin layer comprising a blended resin of (a) a high-density polyethylene having a density of 0.950 g/cm$^3$ or more and a melt index of 10–40, and (b) a low-density polyethylene having a density of 0.930 g/cm$^3$ or less and a melt index of 1–40, and the weight ratio of (b)/(a) being 70/30-5/95, preferably 70/30-20/80, more preferably 60/40-40/60.

For providing light-shielding ability to the wrapping material at least one layer of the wrapping material contains therein a light-shielding substance in an amount of 1.0–30 g/m$^2$. Light-shielding substance may be of the powder form or film or foil form. The light-shielding layer of the latter form may be formed on any layer of the laminate. For instance, a light-shielding metallic foil may be laminated on a paper support optionally via an adhesive layer, in order to form light-shielding papers, which are applicable to photographic films, etc., particularly to roll films.

BRIEF EXPLANATION OF DRAWINGS

FIGS. 3 through 5 are sectional views showing some preferred embodiments of the present invention; wherein FIG. 3 is a laminated sheet where a light-shielding layer (6) is laminated via an adhesive layer (5), in addition to the constitution of FIG. 2; FIG. 4 is another laminated sheet where the light-shielding layer (6) is laminated without applying an adhesive layer; and FIG. 5 is still another laminated sheet having a two-layer paper support (3) and (3a).

In these drawings, (1) represents a polyethylene layer, (2) a protective layer, (3) a paper support, (4) a blended polyethylene layer, (5) an adhesive layer, and (6) a light-shielding layer, wherein (a) means that the respective layer contains a light-shielding substance.

The excellent merits of the present invention will be self-explanatory from the following examples.

DETAILED DESCRIPTION OF THE PREFERRED EMBODIMENT

The density of polyethylenes differs according to the difference of the manner of the manufacture thereof such as high-pressure method or low-pressure process, and other properties thereof gradually vary with the manufacturing manners. In the present invention, polyethylenes having a density of 0.950 g/cm$^3$ or more are called "high-density polyethylene (HDPE)" and those having a density of 0.930 g/cm³ or less are called "low-density polyethylene (LDPE)", not necessarily depending upon the manufacturing manners. Both of these two kinds of polyethylenes have heretofore been used individually for the use of this kind (as wrapping materials or light-shielding papers for photographic materials). However, it has been considered hitherto that, even if the low-density polyethylene and the high-density polyethylene be blended, the characteristics of the blended resin would be confined at most to the intermediate degrees of these two kinds of polymers, and therefore any specific characteristics would not be able to be expected. As a result, it has hitherto been overlooked to use the blended resin, without any actual confirmation thereon.

The present invention is based on such discovery that, by polymer-blending these two kinds of polyethylenes with a range of a specifically determined ratio, unexpected effects may be attained to eliminate drawbacks in the individual polyethylenes when used alone, i.e., the electrification and adhesiveness may be improved in the blended polymer, but also the blended polymer may well be cut without occurrence of whisker-like burrs in the cut edge, as compared with both of the individual polymers when used alone.

Figure 1:
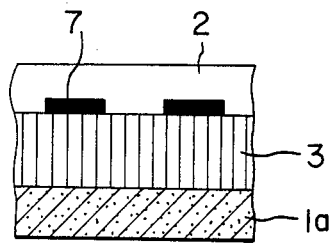
FIG. 1 is a sectional view showing one typical embodiment of a conventional light-shielding paper.
Figure 2:
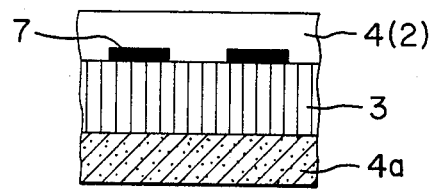
FIG. 2 is a sectional view showing the basic constitution of a light-shielding paper of the present invention.

When blended within the range that the ratio (b)/(a) of (b) low-density polyethylene/(a)high-density polyethylene is 70/30-5/95 (by weight), the blended polymers are superior to the high-density polyethylene alone. The most excellent cut state of the blended polymers resides in the range of 60/40-40/60. This characteristic is far better than middle-density polyethylenes having a density corresponding to the average density of the blended polymers (4) of the present invention (FIG. 2). Within this range, remaining of whisker-like polymer burrs on the cut edge is far less, when cut or perforated, and there is no problem of occurrence of dusts on the surface of a film or in a camera, resulting from these whisker-like burrs.

It is necessary that the melt index [M.I. at the temperature of 190° C., under the load of 2160 g, measured by JISK 6760 (=ASTM 1238)] of high-density polyethylenes be in the range of 10–40. Other polyethylenes having a melt index of less than 10, even though they are of high density, do not have such blend effect. On the other hand, it is necessary that the melt index of low-density polyethylenes LDPE be in the range of 1–40, because extrusion lamination is difficult if M.I. is out of said range. With respect to the low density polyethylenes LDPE, there is almost no large difference in the M.I. range of 1–40.

Considering the blend range together with other characteristics, it is determined that the appropriate blend range is in the ratio of 70/30-5/95. With respect to the electrification property and the slide property with films, high-density polyethylenes are superior to low-density polyethylenes, and the blended polyethylenes are in the middle level of these two.

With respect to the curl property and adhesiveness with paper, low-density polyethylenes are better, and blended polyethylenes show middle properties. It is concluded that the blend range which may satisfy all of the above mentioned five characteristics including the cut property, in a well-balanced state, is 70/30-5/95, more preferably 70/30-20/80, most preferably 60/40-40/60.

Light-shielding papers in the above mentioned range, when used as backing paper for roll films, are free from problems such as occurrence of static marks, and the adhesiveness to paper is good. In addition, with respect to the slide property, take-up resistance of films is small. Thus, good products having well-balanced properties may be obtained, as compared with conventional goods.

Figure 3:
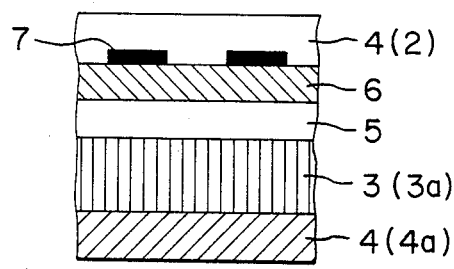
Figure 4:
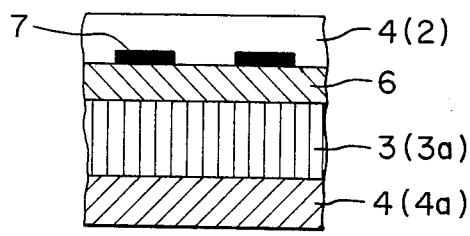
Figure 5:
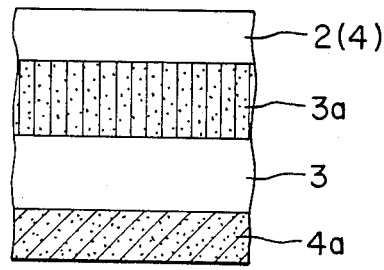

When the present materials are used for moisture-proof packaging of photographic materials or as a leader paper, it is unnecessary to consider the light-shielding property thereof, whereas they may be used as highly useful light-shielding papers so far as a light-shielding property is imparted to at least one layers of the present materials. A light-shielding substance is incorporated in at least one layer of laminated sheets, for example, as follows: Referring to FIGS. 3 and 4, an aluminum foil or a deposited aluminum film [light-shielding substance layer (6)] is provided on the surface of paper, or a light-shielding layer is printed (7). Alternatively, light-shielding substance of the powder form is incorporated in any of the laminated layers, e.g., the paper support (3) and/or the resin layer (4), referring to FIGS. 2 and 5. Said light-shielding substance of the powder form may be any of known substances such as carbon black, aluminum powder, coloring pigments, coloring dyestuffs, etc. In case the light-shielding substance is to be incorporated in the paper support, the appropriate amount thereof is 1–20 g/m², preferably 2–12 g/m², more preferably 3–10 g/m², while in case incorporated in the polyethylene layer, the appropriate amount thereof is 12 g/m² or less, preferably 0.5–6.0 g/m², more preferably 1.5–4 g/m². These substances may be incorporated in any layer or layers of the whole wrapping materials, and the above mentioned amount may be imparted not only to one layer only but also to two or more layers dividedly. In addition, other layers which are necessary for light-shielding papers may additionally be laminated, for example, a protective layer may be superposed on a printed surface, the paper support may be comprised of a laminated sheet (refer to FIG. 5), and an adhesive layer may be added for improving the adhesiveness (refer to FIG. 3). Moreover, in accordance with the uses as the wrapping materials, other layers, e.g., any of flexible sheets such as cellophane, metal foil, polymer film such as various kinds of polyethylene films and polyester films, and/or various kinds of papers may additionally be laminated.

Any further known techniques may be imparted to the polyethylene layer, for instance, coating of an adhesion accelerator on the surface of paper for the purpose of improving the adhesiveness of said paper upon extrusion lamination, corona-discharge, flame-treatment, etc. Various kinds of additives such as antioxidants, lubricants, antistatic agents, etc. may optionally be added to the resin.

These wrapping materials to which a light-shielding ability has been imparted are highly useful light-shielding papers especially for photographic roll films, and in addition, these may be utilized in various uses, for instance as a wrapping sheet for roll-type or sheet-type photographic materials, backing papers for roll films, leader papers for instant films, etc.

With respect to light-shielding papers for roll films, the total thickness of said paper is preferably 60–120 microns, and the thickness of the blended resin layer therein is preferably 10–80 microns or so. Regarding other wrapping sheets for photographic materials, the total thickness thereof may be preferably 50–200 microns or so and the thickness of the blended resin layer preferably 10-120 microns or so. Anyway, the thickness is not necessarily limitative.

The present invention will be elucidated in more detail with reference to the examples and accompanying drawings which are presented for illustrative purpose and not limitative purpose. Modification apparent in the art may be made without departing from the concept of the present invention.

A; excellent
B; good
C; practical limit
D; no good (In this connection, the evaluation "B" or more is preferred for the stable supply as the products.) Measurement of melt index was carried out in accordance with JISK 6760 (=ASTM 1238), at the temperature of 190° C. and under the load of 2160 g.

TABLE

| No. | Resins (refer to "Notes") A | B | C | D | Cut property | Curl | Coefficient of friction to film | Occurrence of static marks | |
|---|---|---|---|---|---|---|---|---|---|
| 1 | 0 | — | — | 10 | D | A | 0.75D | occurred | Prior art |
| 2 | 2 | — | — | 8 | C | A | 0.60C | Somewhat occurred | Present invention |
| 3 | 4 | — | — | 6 | A | B | 0.40B | Not occurred | Present invention |
| 4 | 6 | — | — | 4 | A | B | 0.35A | Not occurred | Present invention |
| 5 | 10 | — | — | 0 | B | D | 0.30A | Not occurred | Prior art |
| 6 | 10 | — | — | 0 | B | A | 0.30A | Not occurred | Comparison |
| 7 | — | 4 | — | 6 | D | B | 0.40 | Not occurred | Comparison |
| 8 | — | 10 | — | 0 | D | D | 0.30 | Not occurred | Comparison |
| 9 | — | — | 10 | 0 | D | C | 0.40 | Not occurred | Comparison |

EXAMPLE

A sheet of paper (basis weight: 70 g/m$^2$) containing 5 wt% of carbon black was printed in accordance with the use as a light-shielding paper, and an ethyl cellulose protective layer was superposed on said paper, and on the black surface thereof was laminated a polyethylene layer comprising the composition as shown in the following Table and containing 5 wt% of carbon black, in the thickness of 20 microns.

Following points should be noted:

No. 1 and 5 belong to a conventional sheet provided with a conventional polyethylene layer D and A, respectively, only on one side of the paper support. Except for No. 6, the polyethylene layer was applied only on one side of the paper support. No. 6 is a comparative example where the protective layer is replaced by a polyethylene laminated layer which is same as that laminated on the other surface of the paper support, but does not contain any carbon black. Nos. 7 through 10 are comparative examples where polyethylenes having a density and a melt index falling outside the range of the present invention were used. Among various characteristics, the cut property is specifically improved by using the blended polymer.

As appreciated by contrasting No. 6 with No. 5 the curl can be reduced in the prior art by laminating the conventional polyethylene layers on the both sides (No. 6) of the paper support. Consequently, it is evident that the inventive sample Nos. 2-4 have a reduced curling with a single polyethylene layer and a still less curling will result if the particular polyethylene layers are applied on the both sides of the paper support. To provide two polyethylene layers on the both sides entrains difficulty in processing and cost up.

Notes:
Resin A; density* (0.958), melt index (23)
Resin B; density (0.957), melt index (6.5)
Resin C; density (0.944), melt index (30)
Resin D; density (0.918), melt index (10)
*density unit: g/cm$^3$
Evaluation

What is claimed is:

1. Wrapping materials for photographic materials, comprising laminated layers comprised of a paper support and at least one thermoplastic resin layer superposed on at least one surface of said paper support; wherein said thermoplastic resin layer comprises a blended resin of
   (a) a high density polyethylene having a density of 0.950 g/cm$^3$ or more and a melt index of 10-40, and
   (b) a low density polyethylene having a density of 0.930 g/cm$^3$ or less and a melt index of 1-40, the weight ratio of (b)/(a) being 70/30-5/95.

2. The wrapping materials as defined in claim 1, wherein the weight ratio of (b)/(a) is 70/30-20/80.

3. The wrapping materials as defined in claim 2, wherein said ratio of (b)/(a) is 60/40-40/60.

4. The wrapping materials as defined in claim 1, wherein light-shielding substance is incorporated in at least one layer of the wrapping materials in an amount of 1.0-30 g/m$^2$ per the total of the wrapping material.

5. The wrapping materials as defined in claim 4, wherein said light-shielding substance is in powder form.

6. The wrapping materials as defined in claim 4, wherein said light-shielding substance is in film or foil form.

7. A backing paper for photographic roll films including the wrapping materials as defined in claim 4.

8. The wrapping materials as defined in claim 4, wherein the light-shielding substance is incorporated in the thermoplastic resin layer.

9. The wrapping materials as defined in claim 4, wherein the light-shielding substance is incorporated in the paper support.

10. The wrapping materials as defined in claim 8, wherein the light-shielding substance is carbon black.

11. The wrapping materials as defined in claim 1, wherein the thermoplastic resin layer possesses superior cutting properties when compared to a resin layer composed of either the high density polyethylene or the low density polyethylene alone.

* * * * *